(12) United States Patent
Tauveron et al.

(10) Patent No.: US 11,489,176 B2
(45) Date of Patent: Nov. 1, 2022

(54) ENERGY PRODUCTION ASSEMBLY COUPLING A FUEL CELL AND A REVERSIBLE THERMODYNAMIC SYSTEM

(71) Applicants: COMMISSARIAT A L'ENERGIE ATOMIQUE ET AUX ENERGIES ALTERNATIVES, Paris (FR); SAFRAN POWER UNITS, Toulouse (FR)

(72) Inventors: Nicolas Tauveron, Grenoble (FR); Benjamin Boillot, Saint-Ismier (FR); Jean-Baptiste Jollys, Moissy-Cramayel (FR)

(73) Assignees: 1). COMMISSARIAT A L'ENERGIE ATOMIQUE ET AUX ENERGIES ALTERNATIVES, Paris (FR); SAFRAN POWER UNITS, Toulouse (FR)

( * ) Notice: Subject to any disclaimer, the term of this patent is extended or adjusted under 35 U.S.C. 154(b) by 127 days.

(21) Appl. No.: 16/958,492
(22) PCT Filed: Dec. 27, 2018
(86) PCT No.: PCT/FR2018/000274
§ 371 (c)(1),
(2) Date: Feb. 5, 2021
(87) PCT Pub. No.: WO2019/129940
PCT Pub. Date: Jul. 4, 2019

(65) Prior Publication Data
US 2021/0167405 A1 Jun. 3, 2021

(30) Foreign Application Priority Data
Dec. 27, 2017 (FR) ...................................... 17 63265

(51) Int. Cl.
*H01M 8/04* (2016.01)
*H01M 8/04029* (2016.01)
(Continued)

(52) U.S. Cl.
CPC .... *H01M 8/04029* (2013.01); *H01M 8/04074* (2013.01); *H01M 8/04111* (2013.01); *H01M 8/04268* (2013.01)

(58) Field of Classification Search
CPC ......... H01M 8/04029; H01M 8/04074; H01M 8/04111
See application file for complete search history.

(56) References Cited

U.S. PATENT DOCUMENTS

2004/0192044 A1* 9/2004 Degertekin ......... H01M 8/0631
438/689
2006/0010872 A1 1/2006 Singh et al.
(Continued)

FOREIGN PATENT DOCUMENTS

DE 199 51 217 A1 4/2000
FR 2 868 605 A1 10/2005
(Continued)

OTHER PUBLICATIONS

Lee, W.-Y. et al., "Power optimization of a combined power system consisting of a high-temperature polymer electrolyte fuel cell and an organic Rankine cycle system," Energy, vol. 113, Jul. 19, 2016, pp. 1062-1070.
(Continued)

*Primary Examiner* — Olatunji A Godo
(74) *Attorney, Agent, or Firm* — Oblon, McClelland, Maier & Neustadt, L.L.P.

(57) ABSTRACT

An assembly for producing energy may include a fuel cell, a fluidic cell circuit configured to receive a first heat-transfer fluid and arranged at least partially around the fuel cell, a reversible thermodynamic system configured to alternatively: (i) evacuate the thermal energy produced by the fuel cell and transform it into mechanical energy through the first heat-transfer fluid, and (ii) input thermal energy to the fuel cell through the first heat-transfer fluid, wherein the ther-
(Continued)

modynamic system includes: (a) a fluidic thermodynamic circuit to receive a second heat-transfer fluid; (b) a first exchanger to exchange thermal energy between the fluidic thermodynamic circuit and the fluidic cell circuit; and (c) a second exchanger configured to exchange thermal energy between the fluidic thermodynamic circuit and an external source. The arrangement may improve fuel cell function, particularly for proton exchange membrane, usefully with fuel cell(s), particularly, proton exchange membrane fuel cells, preferably in transport.

24 Claims, 5 Drawing Sheets

(51) Int. Cl.
*H01M 8/04007* (2016.01)
*H01M 8/04111* (2016.01)
*H01M 8/04223* (2016.01)

(56) References Cited

U.S. PATENT DOCUMENTS

| 2006/0115413 | A1* | 6/2006 | Wegeng | F28D 9/0093 |
| | | | | 423/650 |
| 2015/0340749 | A1 | 11/2015 | Chaudron | |
| 2016/0265392 | A1 | 9/2016 | Mabile | |

FOREIGN PATENT DOCUMENTS

| JP | 2009-283178 A | 12/2009 |
| KR | 10-2015-0011687 A | 2/2015 |

OTHER PUBLICATIONS

International Search Report dated Mar. 25, 2019 in PCT/FR2018/000274 filed on Dec. 27, 2018, 3 pages.

* cited by examiner

ENERGY PRODUCTION ASSEMBLY COUPLING A FUEL CELL AND A REVERSIBLE THERMODYNAMIC SYSTEM

TECHNICAL FIELD OF THE INVENTION

The invention relates to an assembly for producing energy coupling a fuel cell and a reversible thermodynamic system.

The invention relates to the improvement of the functioning of the fuel cells in particular of the proton exchange membrane type.

The invention will have applications in all fields wherein proton exchange membrane fuel cells are used.

The invention will preferably apply to fields of transport.

STATE OF THE ART

Proton exchange membrane fuel cells are known also under the name of polymer electrolyte membrane fuel cells (PEMFC). PEMFCs allow a functioning in ranges of low pressures and temperatures. They comprise a specific polymer electrolyte membrane.

A PEMFC transforms the chemical energy released during the electrochemical reaction of dihydrogen (H2) and dioxygen (O2) into electrical energy, process "opposite" the thermochemical reaction of these two bodies producing thermal energy. A hydrogen jet is directed towards the anode side of the assembly of the electrode membrane. It is, at this instant, split catalytically into protons and electrons. This oxidation reaction in the half-cell is described by:

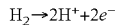
$$H_2 \rightarrow 2H^+ + 2e^-$$

At the same time, an oxygen flow is directed from the cathode side of the MEA. The dioxygen molecules react with the protons crossing through the polymer electrolyte membrane and the electrons arriving through the outer circuit in order to form water molecules. This reduction reaction in the half-cell is electrolytically written:

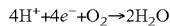
$$4H^+ + 4e^- + O_2 \rightarrow 2H_2O$$

A fuel cell of this type is supplied with hydrogen and oxygen supplies a thermal power of the same order of magnitude as the electrical power. This is all the truer when the fuel cell functions at a high temperature, advantageously between 120° C. and 180° C.

The removal of the heat is therefore a main challenge for avoiding overheating, and therefore the deterioration of the membrane. There are several ways to evacuate this heat:—A circulation of a heat-transfer liquid is ensured inside a bipolar plate having a dedicated thermal circuit or within dedicated plates inserted, for example, every 2 to 3 cells of a fuel cell; —Water is injected with air at the inlet of the cell, and the heat is removed by partial evaporation of water; —Each bipolar plate is equipped with fins and the heat is evacuated by forced circulation of air outside. In all these options, the cooling circuit therefore includes a liquid or gaseous loop with its circulator and optionally (case of liquid) a heat exchanger outwards.

It is moreover studied to enhance this thermal energy, in particular for increasing the electrical efficiency of the fuel cells with the aim of lowering the cost of the energy produced by these systems. All the more so, the temperature difference with the ambient air at the level of the heat exchanger described above is low, and it is thus necessary to use relatively large exchangers.

It has in particular been described in the article, "Power optimization of a combined power system consisting of a high-temperature polymer electrolyte fuel cell and an organic Rankine cycle system" by Won-Yong Lee et al. Energy 113 (2016) 1062-1070 to combine a system implementing an organic Rankine cycle to enhance the thermal energy produced by the fuel cell.

However, this type of development is not sufficient for making the fuel cells usable in various applications, in particular, transport.

There is therefore the need to propose a solution which also improves the energy efficiency of fuel cells, in particular of the PEMFC type.

SUMMARY OF THE INVENTION

To achieve this aim, according to an embodiment, the present invention provides an assembly for producing energy comprising a fuel cell, a fluidic cell circuit configured to receive a first heat-transfer fluid advantageously arranged at least partially around the fuel cell in that the assembly comprises a reversible thermodynamic system configured to alternatively evacuate the thermal energy produced by the fuel cell and to transform it into mechanical energy through the first heat-transfer fluid and to input thermal energy to the fuel cell through the first heat-transfer fluid, the thermodynamic system comprising a fluidic thermodynamic circuit configured to receive a second heat-transfer fluid, and a first exchanger intended to exchange thermal energy between the fluidic thermodynamic circuit and the fluidic fuel circuit, and a second exchanger intended to exchange thermal energy between the fluidic thermodynamic circuit and an external source.

The invention has the advantage of improving notably the overall energy efficiency from a fuel cell by improving both the enhancement of the thermal energy produced by the cell and the energy consumption necessary during the start-up of the fuel cell.

Indeed, a line of research on fuel cells in particular of the PEMFC type functioning at a high temperature relates to the starting-up of these cells. Indeed, such that the cell can start to produce electricity, it is necessary that the membrane reaches a certain temperature in particular of the order of 120° C. for high-temperature PEMFCs. Such that the membrane reaches this temperature, it is therefore necessary to heat the membrane by a thermal energy input. This heat is, for example, input by an electrical resistance placed in the stack of the cell to heat the membrane. This solution is a high consumer of energy.

The present invention therefore evacuates thermal energy to produce mechanical energy, even electrical energy while allowing a thermal energy input thanks to a thermodynamic system configured to function in both functioning directions by being a low consumer of energy.

According to an embodiment, the reversible thermodynamic system, and advantageously the only one, comprises a module with thermodynamic cycles configured to function alternatively in mechanical energy production, for example organic Rankine cycle, and in thermal energy production, for example mechanical steam compression cycle.

According to an embodiment, the reversible thermodynamic system comprises a Stirling engine configured to function alternatively in mechanical energy production and in thermal energy production.

Another aspect of the present invention relates to a method for producing energy by a production assembly such as described above comprising the following successive steps:
of starting-up the fuel cell by a thermal energy input to the cell
of functioning of the fuel cell generating an electrical current and thermal energy
characterised in that during the start-up step, a reversible thermodynamic system inputs thermal energy to the fuel cell through a first heat-transfer fluid and that during the functioning step, said reversible thermodynamic system evacuates the thermal energy produced by the fuel cell through the first heat-transfer fluid and transform it into mechanical energy through a second heat-transfer fluid.

BRIEF DESCRIPTION OF THE FIGURES

The aims, objective, as well as the features and advantages of the invention will better emerge from the detailed description of an embodiment of the latter which is illustrated by the following supporting drawings, wherein.

Figure 1:
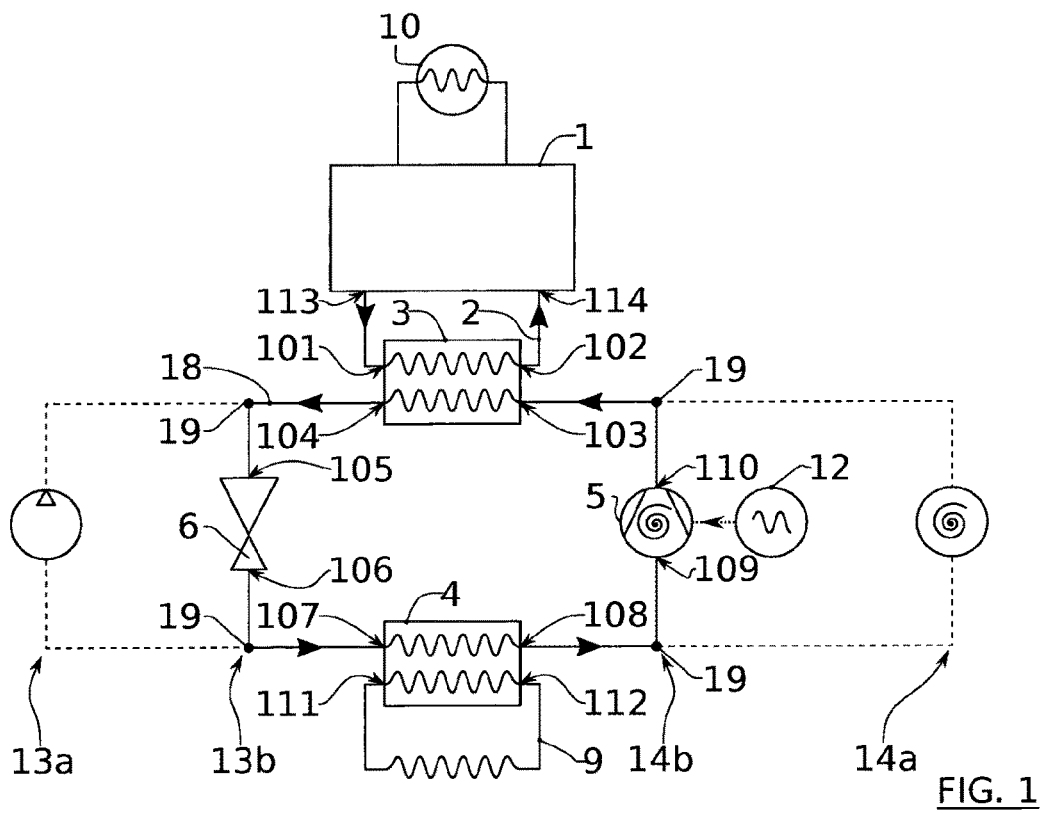
FIG. 1 is a schematic representation of an assembly for producing energy according to an embodiment of the invention during the step of starting-up the cell.

The drawings are given as examples and are not limiting of the invention. They constitute principle schematic representations intended to facilitate the understanding of the invention and are not necessarily to the scale of practical applications. The dotted lines indicate inactive fluidic connections and solid lines, active fluidic connections.

DETAILED DESCRIPTION OF THE INVENTION

Before starting a detailed review of embodiments of the invention, below are stated optional features which can optionally be used in association or alternatively:
Advantageously, the fluidic cell circuit is a closed circuit.
Advantageously, the fluidic thermodynamic circuit is a closed circuit. By closed circuit, this means that the circuit forms a loop wherein the first and the second heat-transfer fluid advantageously continuously circulate.
Advantageously, the reversible thermodynamic system comprises at least one module for producing thermal energy, preferably supplied with electricity, connected to the first heat exchanger.
Advantageously, the module for producing thermal energy is fluidically and/or thermally connected to the first exchanger through the fluidic thermodynamic circuit so as to exchange the thermal energy produced by the module for producing thermal energy to the fluidic cell circuit.
According to a possibility, the module for producing thermal energy comprises a heat pump, more specifically at least one compressor, the compressor being fluidically connected to the first exchanger.
According to a possibility, the module for producing thermal energy comprises a Stirling engine, this Stirling engine being thermally connected to the first exchanger.
Advantageously, the reversible thermodynamic system comprises a module for producing mechanical energy.
According to a possibility, the module for producing mechanical energy comprises an organic Rankine cycle module.
According to a possibility, the module for producing mechanical energy comprises a Stirling engine.
Advantageously, the reversible thermodynamic system, advantageously the only one, associates an organic Rankine cycle module and a heat pump in the form of a steam mechanical compression cycle.
Advantageously, the heat pump comprises a compressor and a reducer arranged in series with the first exchanger and the second exchanger on the fluidic thermodynamic circuit.
Advantageously, the organic Rankine cycle comprises a turbine and a pump, intended to make the second heat-transfer fluid circulate in the fluidic circuit, arranged in series with the first exchanger and the second exchanger on the fluidic thermodynamic circuit.
Advantageously, the compressor is arranged in parallel to the turbine on the fluidic thermodynamic circuit.
Advantageously, the pump is arranged in parallel to the reducer of the fluidic thermodynamic circuit.
Advantageously, the fluidic thermodynamic circuit comprises a heat pump circuit fluidically connecting successively the first exchanger, the reducer the second exchanger, the compressor and again, the first exchanger such that the second heat-transfer fluid circulate successively in the first exchanger, the reducer, the second exchanger, the compressor and again, the first exchanger.
Advantageously, the fluidic thermodynamic circuit comprises an organic Rankine cycle module fluidically connecting successively the first exchanger, the turbine, the second exchanger, the pump and again, the first exchanger such that the second heat-transfer fluid circulates successively in the first exchanger, the turbine, the second exchanger, the pump and again, the first exchanger.
Advantageously, the assembly comprises members for switching the second heat-transfer fluid alternatively to the turbine or the compressor and to the pump or the reducer.
Advantageously, the turbine is connected to an alternator or a compressor or a pump.
Advantageously, the compressor is connected to the electrical supply.
Advantageously, the reversible thermodynamic system comprises a reversible Stirling engine.
Advantageously, the Stirling engine is configured to alternatively produce the mechanical energy from thermal energy and produce thermal energy from mechanical energy, such as a heat pump.

Advantageously, wherein the fluidic thermodynamic circuit comprises a first loop and a second loop, the first loop comprises a pump, configured to allow the circulation of the second heat-transfer fluid between the first exchanger, and a hot zone of the Stirling engine, the second loop, comprises a pump, configured to allow the circulation of the second heat-transfer fluid between the second exchanger and a cold zone of the Stirling engine.

Advantageously, the assembly comprises a third heat exchanger arranged on the first loop configured to exchange thermal energy between the second heat-transfer fluid of the first loop and an intermediate heat-transfer fluid configured to circulate around the hot zone of the Stirling engine, and a fourth heat exchanger arranged on the second loop configured to exchange thermal energy between the second heat-transfer fluid of the second loop and the heat-transfer fluid configured to circulate around the cold zone of the Stirling engine.

Advantageously, comprising a wheel connected to the at least one piston, preferably two, of the Stirling engine.

Advantageously, the fuel cell is of the high temperature proton exchange membrane type, or HT-PEMFC type.

Advantageously, the assembly comprises a module for producing energy associated with the fuel cell configured to produce electricity from the flow of electrons produced by the fuel cell.

It will be preferred to use an alpha-type engine, as it offers a high power/volume ratio adapted to the constraints of integration, an improved efficiency thanks to the presence of a regenerator, as well as a clear dissociation of the hot and cold sources. The working fluid for this cycle is air or nitrogen.

Advantageously, during the start-up step, a first heat exchanger transmits thermal energy from a second heat-transfer fluid circulating in a fluidic thermodynamic circuit and a first heat-transfer fluid circulating in a fluidic cell circuit.

Advantageously, during the start-up step, a second heat exchanger transmits thermal energy from an external source to the second heat-transfer fluid circulating in the fluidic thermodynamic circuit.

Advantageously, the thermodynamic system comprises an organic Rankine cycle module functioning during the functioning step of the fuel cell and configured to transform the heat produced into electrical energy, the organic Rankine cycle module being associated with a heat pump functioning during the step of starting-up the fuel cell and configured to supply thermal energy to the fuel cell.

Advantageously, during the step of starting-up the fuel cell, the second heat-transfer fluid circulates in the fluidic thermodynamic circuit by passing successively through the compressor circulating the second heat-transfer fluid, then the second heat-transfer fluid passes into the first exchanger wherein the second heat-transfer fluid is condensed and transfers thermal energy to the first heat-transfer fluid for starting-up the fuel cell, then passes through the reducer, wherein the second heat-transfer fluid suffers a pressure drop, then passes through the second exchanger, wherein the second heat-transfer fluid is evaporated by recovering thermal energy from a hot source.

Advantageously, during the functioning step of the fuel cell, the second heat-transfer fluid circulates in the fluidic thermodynamic circuit by passing successively through the first exchanger (3) wherein it is vaporised by recovering thermal energy from the first heat-transfer fluid circulating in the fluidic cell circuit, then through the turbine wherein the second heat-transfer fluid is expanded allowing the production of mechanical energy, then through the second exchanger, wherein the second heat-transfer fluid is condensed in contact with a cold source, then through a pump, wherein the second heat-transfer fluid is pressurised to be sent to the first exchanger.

Advantageously, the fluidic thermodynamic circuit comprises a regenerator arranged between the pump and the first exchanger configured to increase the temperature of the second heat-transfer fluid at the inlet of the first exchanger.

Advantageously, the thermodynamic system comprises a reversible Stirling engine configured to supply thermal energy to the fuel cell during the step of starting-up the fuel cell and configured to transform the heat produced into mechanical energy during the functioning step of the fuel cell.

Advantageously, during the start-up step, the second heat-transfer fluid recovers thermal energy at the level of the second exchanger by exchange with external source then transmits thermal energy to a cold zone of the Stirling engine by exchange with a working fluid circulating in the Stirling engine, a piston actuated by a wheel moves the working fluid in the hot zone, the second heat-transfer fluid recovers thermal energy by exchange with the working fluid of the hot zone of the Stirling engine that it transfers to the first heat-transfer fluid in the first exchanger.

Advantageously, during the functioning step, the second heat-transfer fluid recovers thermal energy at the level of the first exchanger by exchange with the first heat-transfer fluid then transmits thermal energy to a hot zone of the Stirling engine by exchange with a working fluid circulating in the Stirling engine so as to actuate a piston of the engine producing a mechanical energy and moving the working fluid in the cold zone, the second heat-transfer fluid recovering the thermal energy by exchange with the working fluid of the cold zone of the Stirling engine.

The use of the indefinite article "a" or "an" for an element or a step does not exclude, except for being mentioned on the contrary, the presence of a plurality of such elements or steps.

It is specified that in the scope of the present invention, the terms "on", "surmounts", "covers" or "underlying" or their equivalents do not necessarily mean "in contact with".

In the present description, the expression "A fluidically connected to B" does not mean necessarily that there is no member between A and B.

By "direct exchange" or "direct coupling", this means that the thermal energy exchange is done directly without any intermediate circuit or component.

The present invention relates to an assembly for producing energy comprising a fuel cell 1.

Preferably, the fuel cell 1 is a high temperature proton exchange membrane fuel cell, i.e. that it starts to function when the membrane reaches a temperature of the order of 90 to 120° C., it is the start-up, a transitional functioning. While functioning, the temperature is rather situated between 120 and 180° C.

The fuel cell 1 is intended to produce electrical energy. The cell 1 comprises a module for producing electricity 10 directly connected to the cell and intended to recover the flow of electrons produced by the cell 1 to produce electrical energy. The fuel cell also produces thermal energy. The assembly according to the invention comprises a fluidic cell circuit 2 configured to receive a first heat-transfer fluid. The fluidic cell circuit 2 is a closed circuit, i.e. that the circuit is closed, so as to form a loop, wherein the first heat-transfer fluid advantageously circulates. The first heat-transfer fluid is of the hydrocarbon type, such as pentane, for example, or carbon dioxide $CO_2$ or $NH_3$ or of the hydrofluorocarbon type or equivalent (HFC, HFO or HFE). The fluidic cell circuit 2 is advantageously arranged at least partially in contact with the cell 1 and more specifically, in contact with the hot portion of the cell 1. For example, an exchange plate, wherein the first heat-transfer fluid circulates, is arranged in the stack of the cell 1.

According to the invention, the assembly comprises a reversible thermodynamic system. This reversible thermodynamic system can also be called reversible energy conversion system.

By "reversible", this means that the thermodynamic system functions alternatively in producing mechanical energy from thermal energy or in producing thermal energy. The same thermodynamic system functions therefore according to one embodiment and in the other. The thermodynamic system according to the invention is configured to evacuate the thermal energy produced by the fuel cell 1 and transform it into mechanical energy, even optionally into electrical energy and alternatively, supply thermal energy to the fuel cell 1. Thus, the assembly according to the invention has the two functions alternatively, i.e. one then the other.

The assembly comprises, for this purpose, advantageously a fluidic thermodynamic circuit 18 configured to receive a second heat-transfer fluid. The fluidic thermodynamic circuit 18 is independent, i.e. that it is not fluidically connected to the fluidic cell circuit 2. The fluidic thermodynamic circuit 18 is a closed circuit, i.e. closed so as to form a loop, wherein the second heat-transfer fluid circulates. The second heat-transfer fluid can be identical or different from the first heat-transfer fluid. The second heat-transfer fluid is of the hydrocarbon type, such as pentane, for example, or carbon dioxide $CO_2$ or $NH_3$ or of the hydrofluorocarbon type or equivalent (HFC, HFO or HFE).

The thermodynamic system comprises a first thermal or heat exchanger 3 intended to exchange thermal energy between the fluidic thermodynamic circuit 18 and the fluidic cell circuit 2 and a second thermal or heat exchanger 4 intended to exchange thermal energy between the fluidic thermodynamic circuit 18 and an external source 9.

The first heat exchanger 3 comprises an inlet 201 of the first heat-transfer fluid and an outlet 202 of the first heat-transfer fluid. The inlet 201 and the outlet 202 ensure the fluidic connection of the fluidic cell circuit to the first exchanger 3. The first heat exchanger 3 further comprises an inlet 103 of the second heat-transfer fluid and an outlet 104 of the second heat-transfer fluid. The inlet 103 and the outlet 104 ensure the fluidic connection of the fluidic thermodynamic circuit to the first exchanger 3.

Advantageously, the thermodynamic system comprises a module for producing mechanical energy from thermal energy of the fuel cell and a module for producing thermal energy intended to be supplied to the fuel cell.

The module for producing thermal energy is advantageously supplied with electricity. The module for producing thermal energy is advantageously fluidically connected to the first heat exchanger.

The module for producing thermal energy comprises, according to the first embodiment, a heat pump. The heat pump comprises a compressor 5 supplied with electricity and of which a fluidic outlet 110 of the second heat-transfer fluid is fluidically connected to a fluidic inlet 203 of the first heat exchanger 3.

The module for producing thermal energy comprises, according to a second embodiment, a Stirling engine. The Stirling engine is supplied with electricity and is thermally connected to the first exchanger 3, more specifically to an inlet 303, 403 of the first exchanger 3.

The module for producing mechanical energy is, according to a first embodiment, an organic Rankine cycle module and according to a second embodiment, a Stirling engine.

According to a first embodiment, the thermodynamic system comprises a heat pump reversible organic Rankine cycle module (ORC). The organic Rankine cycle module, also called below, Rankine module, allows in particular to produce mechanical power from a heat source with low or medium temperature. The Rankine module allows to enhance the thermal energy produced by the fuel cell 1 by transforming thermal energy into mechanical energy. The heat pump allows to transfer thermal energy, i.e. calories, from a low temperature medium, such as a cold source to a high temperature medium, such as a hot source. It therefore allows to invert the "natural direction" of the spontaneous transfer of thermal energy. The heat pump allows to supply thermal energy to the fuel cell 1. According to the invention, the thermodynamic system is configured to alternatively function in Rankine module embodiment and in heat pump embodiment.

Advantageously, the heat pump according to the invention functions in a temperature range comprised between 15 and 120° C. It allows a substantially saving of electricity with respect to an electrical heating of the state of the art. The coefficient of performance (COP) of the heat pump is advantageously of the order of 3 to 4.

The heat pump comprises a reducer 6 and a compressor 5 arranged in series with the first heat exchanger 3 and the second heat exchanger 4. Advantageously, these members are arranged on the fluidic thermodynamic circuit 18, and more specifically, on a circuit called heat pump circuit, in particular such that the second heat-transfer fluid preferably passes successively through the first heat exchanger 3, the reducer 6, the second heat exchanger 4 and the compressor 5, then again, the first heat exchanger 3.

The Rankine module comprises a turbine 8 and a pump 7 arranged in series with the first heat exchanger 3 and the second heat exchanger 4. Advantageously, these members are arranged on the fluidic thermodynamic circuit 18, and more specifically on a circuit called Rankine module circuit, in particular such that the second heat-transfer fluid preferably passes successively through the first heat exchanger 3, the turbine 8, the second heat exchanger 4 and the pump 7, then again, the first heat exchanger 3.

The Rankine module and the heat pump are hybridised. By "hybridised", this means that the members are associated to form a thermodynamic system according to the invention. The Rankine module and the heat pump share at least partially the same fluidic thermodynamic circuit, the first heat exchanger 3 and the second heat exchanger 4, indeed the heat pump circuit is at least partially common with the Rankine module circuit. The heat pump and the Rankine module are associated and are functioning alternatively. The coupling of the Rankine module and of the heat pump extends structurally, and their functioning is alternative and not simultaneous.

More specifically, the reducer 6 and the pump 7 are arranged in parallel on the fluidic circuit 18, i.e. that the reducer 6 is arranged on a branch 13b of the fluidic thermodynamic circuit 18 advantageously connecting the first exchanger 3 and the second exchanger 4, and the pump 7 is arranged on a branch 13a of the fluidic thermodynamic circuit 18 advantageously connecting the first exchanger 3 and the second exchanger 4. The two branches 13a, 13b are parallel and the circulation of the second heat-transfer fluid in either of the two branches 13a, 13b is advantageously controlled by switching members comprising, for example, three-way valves 19 orientating the second heat-transfer fluid in either of the two branches 13a, 13b according to the functioning embodiment of the production assembly and of the thermodynamic system.

Likewise, the turbine 8 and the compressor 5 are arranged in parallel on the fluidic circuit, i.e. that the turbine 8 is arranged on a branch 14a of the fluidic thermodynamic circuit 18 advantageously connecting the first exchanger 3 and the second exchanger 4, and the compressor 5 is arranged on a branch 14b of the fluidic thermodynamic circuit 18 advantageously connecting the first exchanger 3 and the second exchanger 4. The two branches 14a, 14b are parallel and the circulation of the second heat-transfer fluid in either of the two branches 14a, 14b is advantageously controlled by switching members comprising, for example, three-way valves 19 orientating the second heat-transfer fluid in either of the two branches 14a, 14b according to the functioning embodiment of the production assembly and of the thermodynamic system.

The pump 7 is a pump configured to make the second heat-transfer fluid circulate in the fluidic thermodynamic circuit 18. The turbine 8 transforms thermal energy into mechanical energy by making a rotating shaft rotate. According to different possibilities, the turbine is connected to an alternator to produce electricity or to a compressor or a pump to directly use mechanical energy.

According to an advantageous possibility, the thermodynamic system comprises a reversible scroll compressor coupled or associated with an engine or alternator. This possibility allows an increase in investment, mass and bulk by limiting the number of members in the thermodynamic system.

Advantageously, the flow of two fluids exchanging thermal energy at the level of a heat exchanger of the assembly are made in the opposite direction so as to optimise the exchanges.

Regarding FIGS. 1 and 2, the structure and the functioning of the assembly for producing energy according to a first embodiment are described below.

The assembly comprises the fluidic cell circuit 2 comprising a first heat-transfer fluid. The fluidic cell circuit successively passes through the cell 1 and the first exchanger 3 so as to alternatively evacuate thermal energy from the cell 1 to the first exchanger 3 or to supply thermal energy from the cell 1 to recover at the level of the first exchanger 3.

The compressor 5 is advantageously supplied by an electrical supply 12 such as, for example, batteries storing electrical energy or an electrical network in particular embedded for transport applications.

The reducer 6 is of the type of a valve allowing to expand the second heat-transfer fluid passing through it.

FIG. 1 illustrates an assembly according to the invention, wherein the thermodynamic system comprises a Rankine module associated with a heat pump. In the case illustrated, the thermodynamic system functions in heat pump mode, i.e. that the second heat-transfer fluid circulates in the fluidic thermodynamic circuit 18, called heat pump circuit, by passing through the different elements of the heat pump.

The fluidic cell circuit 2 comprises an outlet 113 of the first heat-transfer fluid outside of the cell 1 which is fluidically connected to an inlet 101 of the first heat-transfer fluid in the first exchanger 3. The first heat-transfer fluid passes through the first heat exchanger 3 and exits through an outlet 102 fluidically connected to an inlet 114 of the first heat-transfer fluid in the cell 1.

The fluidic thermodynamic fluid 18, called heat pump circuit, is described below, an outlet 104 of the second heat-transfer fluid of the first heat exchanger 3 is fluidically connected to an inlet 105 of the reducer 6. The second heat-transfer fluid exits from the reducer 6 through an outlet 106 fluidically connected to an inlet 107 of the second exchanger 4. The second heat-transfer fluid exits from the second exchanger 4 by an outlet 108 fluidically connected to an inlet 109 of the compressor 5. The second heat-transfer fluid exits from the compressor 5 through an outlet 110 fluidically connected to an inlet 103 of the first thermal exchanger 3. Advantageously, the fluidic connections between the different members comprise switching members such as valves 19 of the three-way type allowing the needle the second heat-transfer fluid into the branches 13a, or 13b and 14a or 14b. At the level of the second heat exchanger 4 circulates an external source 9 penetrating into the second exchanger 4 through an inlet 111 and exits from the second exchanger 4 through an outlet 112. This external source 9 is a cold source, for example air from the cabin of an aeroplane or a source of water that is heated or optionally the outside air.

While functioning, the assembly according to the invention, as the case may be, of FIG. 1, allows the starting-up of the cell 1.

The second heat-transfer penetrates into the compressor 5. The compressor 5 circulates the second heat-transfer fluid which exits through the outlet 110 of the compressor 5 advantageously in the gaseous and hotter state than it entered there. The second heat-transfer fluid thus passes through the first exchanger 3 functioning as a condenser after having been advantageously needled by a valve 19. During its passage into the condenser 3, the second heat-transfer fluid transfers its thermal energy, i.e. calories and is condensed. The second heat-transfer fluid changes state. In the first exchanger 3, the first heat-transfer fluid circulates and recovers the calories from the second heat-transfer fluid so as to supply them to the cell 1. Advantageously, the fluidic connection, i.e. the pipes situated between the condenser 3 and the reducer 6 is called liquid line, the second heat-transfer fluid being in the liquid state. At the outlet 104, the second heat-transfer fluid is needled to the branch 13b comprising the reducer 6 by a switching means such as a valve 19. The reducer 6 is supplied in the second heat-transfer fluid in the liquid state. The reducer 6 creates a restriction inducing a pressure drop of the second heat-transfer fluid. At the outlet 106 of the reducer 6, the second heat-transfer fluid has a lower pressure than at the inlet 105 as well as a lower temperature. The second heat-transfer fluid is generally in a two-phase mixture. The second heat-transfer fluid is needled towards the second exchanger 4 through switching members such as a valve 19 then passes through said second exchanger 4 functioning as an evaporator. The second heat-transfer fluid in the liquid state is evaporated in the second exchanger 4 by absorbing the calories coming from an external source 9 circulating in the second exchanger 4. The second heat-transfer fluid in the gaseous state is thus suctioned through the inlet 109 of the compressor 5 and the cycle renews.

Figure 2:
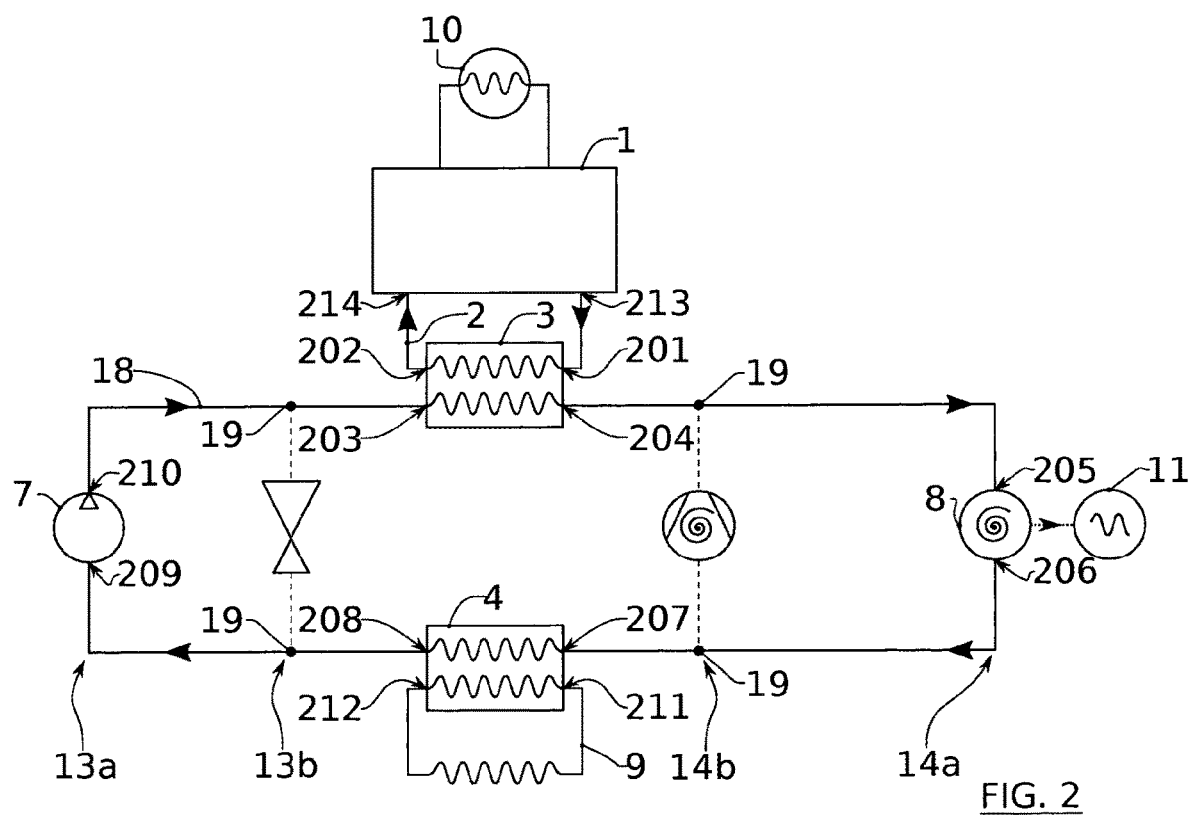
FIG. 2 is a schematic representation of an assembly for producing energy according to the first embodiment of the invention during the functioning step of the cell.

FIG. 2 illustrates an assembly according to the invention, wherein the thermodynamic system comprises a Rankine module associated with a heat pump. In the case illustrated, the thermodynamic system functioning in the Rankine module embodiment, i.e. that the second heat-transfer fluid circulates in the fluidic circuit by passing through the different members of the Rankine module.

The fluidic cell circuit 2 comprises an outlet 213 of the first heat-transfer fluid outside of the cell 1 which is fluidically connected to an inlet 201 of the first heat-transfer fluid in the first exchanger 3. The first heat-transfer fluid passes through the first heat exchanger 3 and exits through an outlet 202 fluidically connected to an inlet 114 of the first heat-transfer fluid in the cell 1.

The fluidic thermodynamic circuit 18, called Rankine module circuit is described below, an outlet 204 of the second heat-transfer fluid of the first heat exchanger 3 is fluidically connected to an inlet 205 of the turbine 8. The second heat-transfer fluid exits from the turbine 8 through an outlet 206 fluidically connected to an inlet 207 of the second exchanger 4. The second heat-transfer fluid exits from the second exchanger 4 through an outlet 208 fluidically connected to an inlet 209 of the pump 7. The second heat-transfer fluid exits from the pump 7 through an outlet 210 fluidically connected to an inlet 203 of the first heat exchanger 3. Advantageously, the fluidic connection between the different members comprise switching members such as valves 19 of the three-way valve type allowing the needle the second heat-transfer fluid into the branches 13a, or 13b and 14a or 14b. At the level of the second heat exchanger 4, circulates an external source 9 penetrating into the second exchanger 4 through an inlet 211 and exits from the second exchanger 4 through an outlet 212. The external source 9 can be the same as that described above.

While functioning, the assembly according to the invention as the case may be of FIG. 2, allows the evacuation of the thermal energy produced by the cell 1 and its enhancement in particular in mechanical energy.

The second heat-transfer fluid passes through the first exchanger 3 functioning as an evaporator. During its passage into the evaporator 3, the second heat-transfer fluid recovers the thermal energy, i.e. calories and is vaporised. The second heat-transfer fluid changes state. In the first exchanger 3, the first heat-transfer fluid circulates and transmits calories to the second heat-transfer fluid so as to evacuate them from the cell 1. The second heat-transfer fluid is needled to the branch 14a comprising the turbine 8 through a switching means such as a valve 19. The turbine 8 is supplied with second heat-transfer fluid in the gaseous state. The turbine 8 also called expander allows to expand the second heat-transfer fluid from high pressure to low pressure by driving a rotating shaft generating mechanical energy which could be transformed into electrical energy, in particular by an alternator 11. At the outlet 206 of the turbine, the second heat-transfer fluid has a lower pressure than at the inlet 205 as well as a lower temperature. The second heat-transfer fluid is needled to the second exchanger 4 through switching members such as a valve 19 then passes through said second exchanger 4 functioning as a condenser. The second heat-transfer fluid in the gaseous state is condensed in the second exchanger 4 by releasing calories to an external source 9 circulating in the second exchanger 4. The second heat-transfer fluid in the liquid state exits through the outlet 208 and is needled to the branch 13a comprising the pump 7 through a switching means such as a valve 19 allowing to circulate the second heat-transfer fluid in the fluidic thermodynamic circuit. The heat-transfer fluid exits from the pump to penetrate into the first heat exchanger 3 and the cycle renews.

Figure 3:
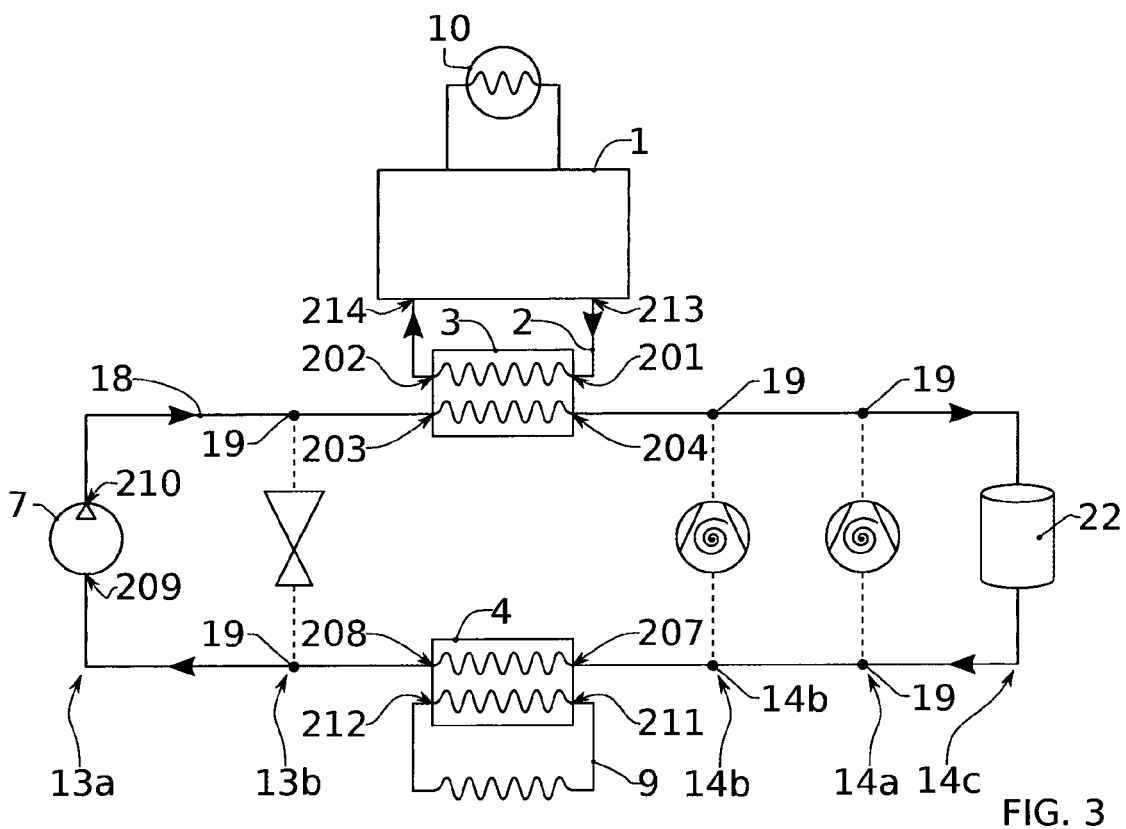
FIG. 3 is a schematic representation of an assembly for producing energy according to a variant of the first embodiment of the invention during the functioning step of the cell.
Figure 4:
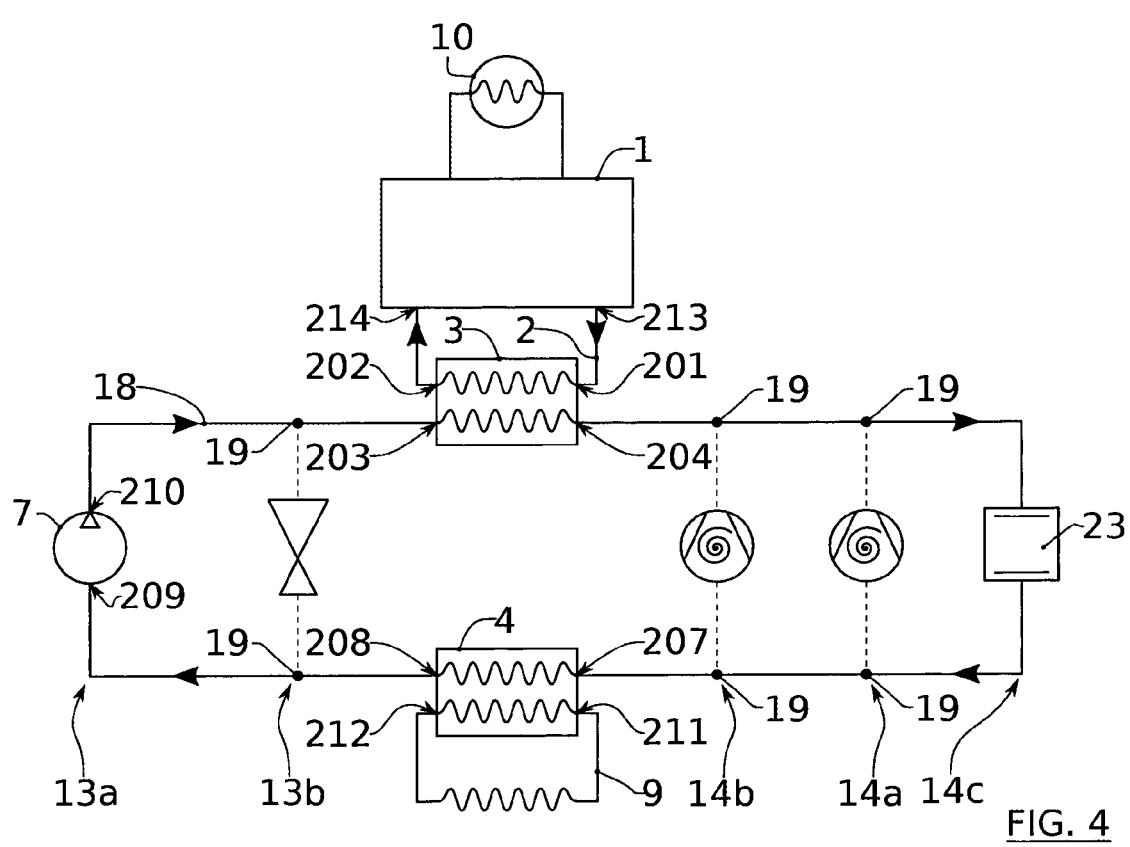
FIG. 4 is a schematic representation of an assembly for producing energy according to a variant of the first embodiment of the invention during the functioning step of the cell.

FIG. 3 and FIG. 4 illustrate variants of the first embodiment, wherein the assembly according to the invention complementarily comprises means for storing the thermal energy produced by the fuel cell or modules for using thermal energy allowing the direct use of thermal energy. As an example, the storage means illustrated in FIG. 3 comprise water ballasts 22 which are heated and store thermal energy, other types of thermal storage such as phase change materials can also be used. Such as illustrated in FIG. 3, the storage means are arranged on the fluidic thermodynamic circuit 18 in parallel with the turbine 8 and with the compressor 5. The storage means are arranged on a parallel branch 14c. Preferably, the branch 14c is connected to the fluidic thermodynamic circuit by switching members such as three-way valves 19.

In the same way, FIG. 4 illustrates the arrangement of modules for using thermal energy, like for example a furnace or a heating 23.

According to a second embodiment, the thermodynamic system comprises a reversible Stirling engine. The Stirling engine is configured to alternatively produce mechanical energy from thermal energy produced by the fuel cell 1 and to supply thermal energy to the fuel cell from mechanical energy.

As in the first embodiment, the assembly comprises the fluidic cell circuit 2 arranged in contact with the cell 1 and more specifically, the membrane of the cell 1.

Likewise, the thermodynamic system comprises the fluidic thermodynamic circuit 18, the first exchanger 3 and the second exchanger 4. The first exchanger 3 allows the exchange of thermal energy between the fluidic thermodynamic circuit 12 and the fluidic cell circuit 2. Likewise, the second exchanger 4 allows the exchange of thermal energy between the fluidic thermodynamic circuit 18 and an external source 9, in particular such as described above.

The Stirling engine 15 comprises a chamber receiving a working fluid and at least one piston 25.

Different types of Stirling engines exist. According to the invention, it will be preferable to use an alpha-type engine, as it offers an increased power/volume ratio adapted to the constraints of integration, an improved efficiency thanks to the presence of a regenerator, as well as a clear dissociation of the hot and cold sources.

Figure 5:
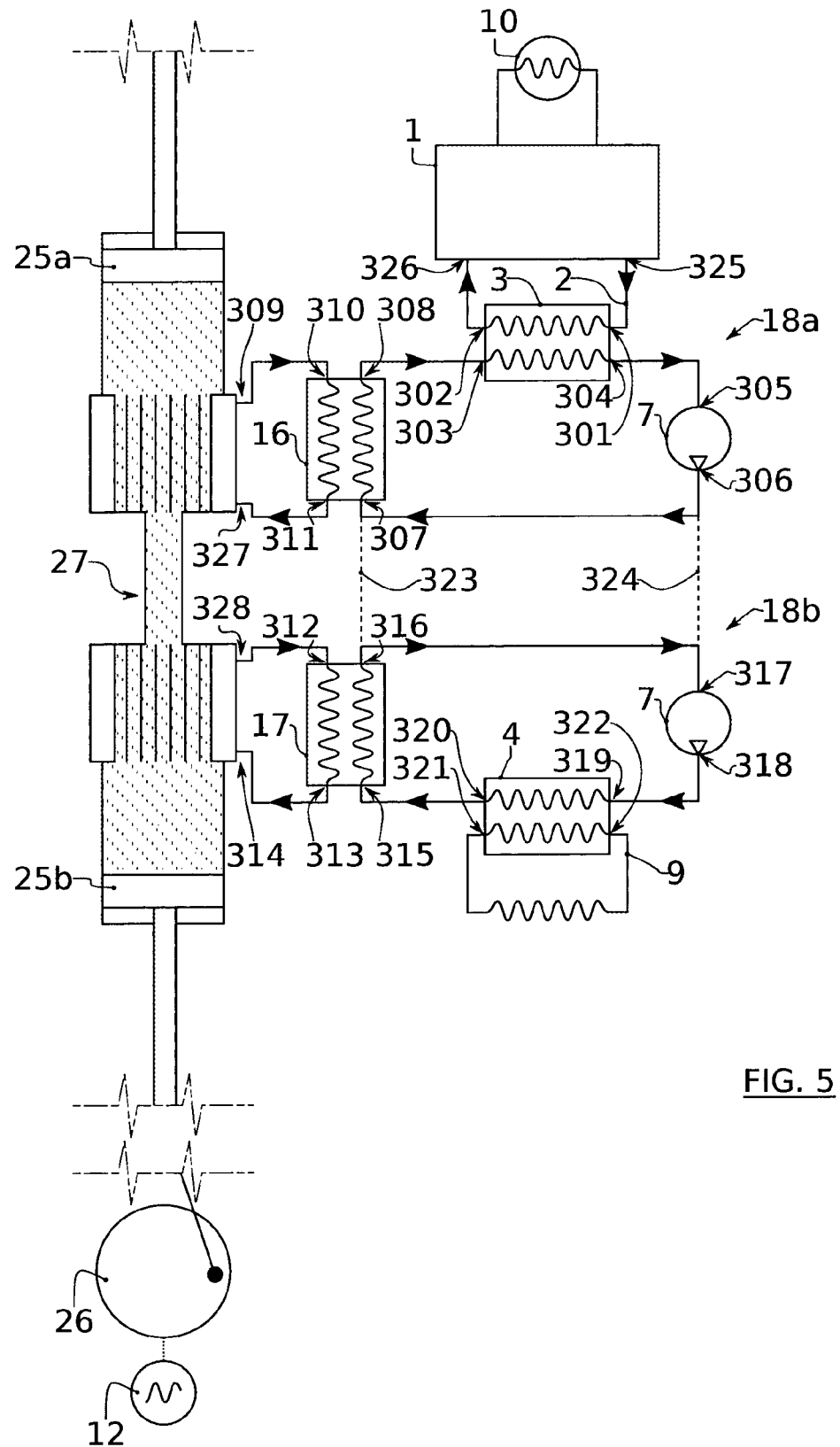
FIG. 5 is a schematic representation of an assembly for producing energy according to a second embodiment of the invention during the step of starting-up the cell.
Figure 6:
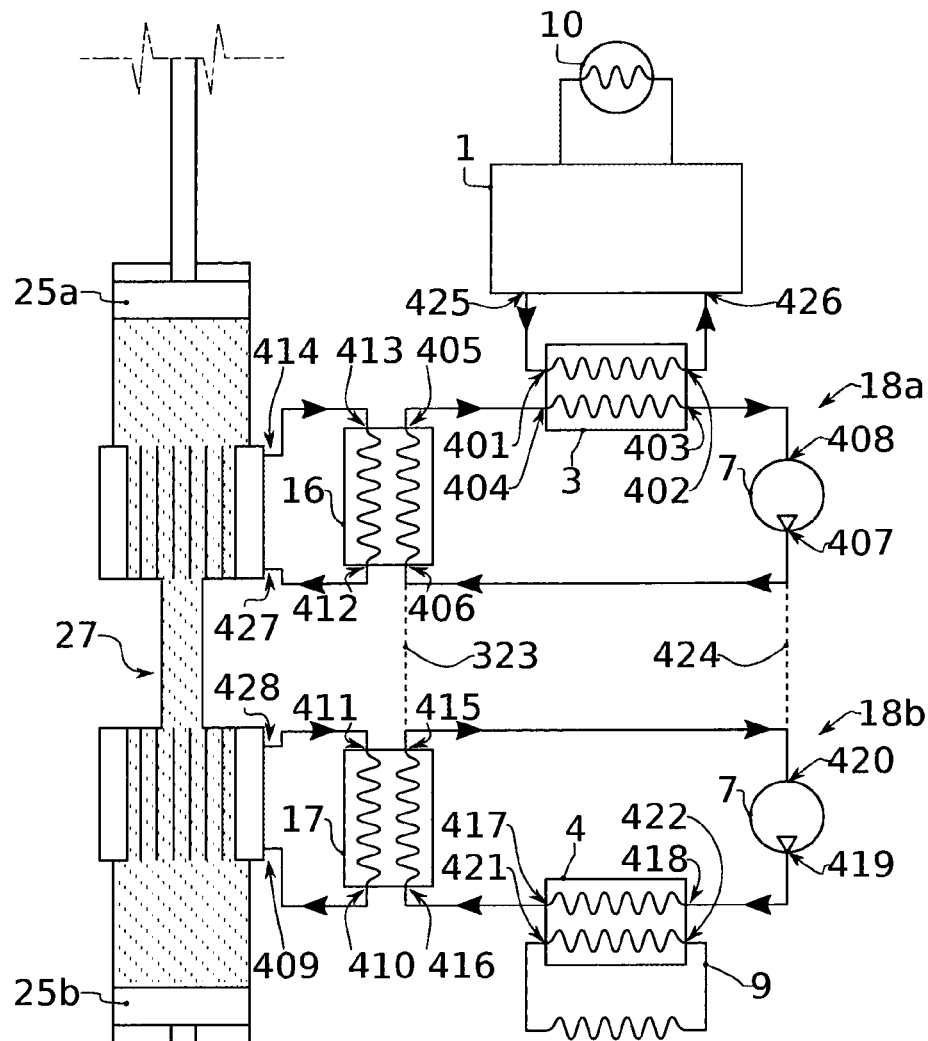
FIG. 6 is a schematic representation of an assembly for producing energy according to the second embodiment of the invention during the functioning step of the cell.
Figure 6:
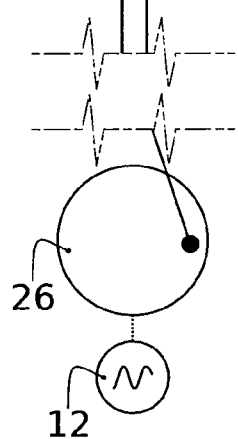
Figure 7:
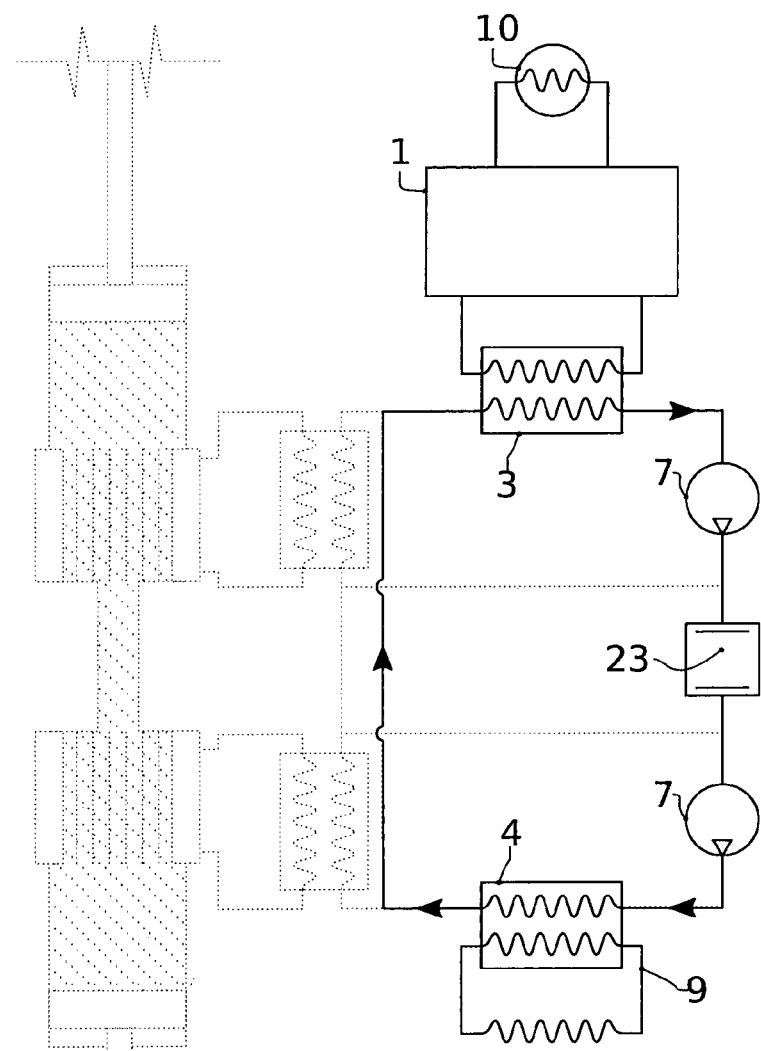
FIG. 7 is a schematic representation of an assembly for producing energy according to a variant of the second embodiment of the invention during the functioning step of the cell.

The Stirling engine 15 such as represented in FIGS. 5 to 7 corresponds to an alpha-type engine. The Stirling engine comprises a hot zone 20 formed in a first chamber receiving a first piston 25a and a cold zone 21 formed in a second chamber receiving a second piston 25a. The working fluid is moved between these two zones, either by the pistons 25a, 25b in the heat pump embodiment, i.e. production of thermal energy, or by variations in volume of the working fluid actuating the pistons 25a and 25b during the production of mechanical energy. The pistons 25a and 25b are connected to a wheel 26 optionally connected to an alternator 11 to produce electricity or an electrical supply 12 to actuate the wheel 26.

Preferably, the fluidic thermodynamic circuit 18 comprises a first loop 18a and a second loop 18b. Advantageously, during the start-up step and preferably also during the functioning step allowing the transformation of thermal energy into mechanical energy, the first loop 18a and the second loop 18b are not fluidically connected. The first loop 18a and the second loop 18b form independent fluidic circuits. Preferably, the heat-transfer fluid circulating in the two loops 18a and 18b is identical.

According to the invention, the fluidic thermodynamic circuit 18 exchanges thermal energy with the Stirling engine 15. More specifically, the first loop 18a exchanges thermal energy with the hot zone 20 of the Stirling engine 15 and the second loop 18b exchange thermal energy with the cold zone 21 of the Stirling engine 15.

The first loop 18a comprises the first exchanger 3 and the second loop 18b comprises the second exchanger 4.

The thermal exchange between the second heat-transfer fluid of the first loop 18a and the hot zone 20 can be done directly by circulation of the second heat-transfer fluid around the hot zone 20. Likewise, the thermal exchange between the second heat-transfer fluid of the second loop 18b and the cold zone 21 can be done directly by circulation of the second heat-transfer fluid around the cold zone 21.

Advantageously, according to another possibility, in particular illustrated in FIGS. 5 to 7, the thermodynamic system comprises a third heat exchanger 16 and a fourth heat exchanger 17. Thus, the heat exchange between the second heat-transfer fluid of the first loop 18a and the hot zone 20 is done by the third heat exchanger. A heat-transfer fluid circulates around the hot zone 20, then exchanges with the second heat-transfer fluid of the first loop 18a by the third exchanger 16. Likewise, the thermal exchange between the second heat-transfer fluid of the second loop 18b and the cold zone 21 is done by the fourth heat exchanger 17. A heat-transfer fluid circulates around the cold zone 21, then exchanges with the second heat-transfer fluid of the second loop 18b by the fourth heat exchanger 17.

The first loop 18a comprises the first exchanger 3 and the third exchanger 16 and advantageously a pump 7 configured to circulate the second heat-transfer fluid in the first loop 18a of the fluidic thermodynamic circuit 18. The third exchanger 16 is configured to exchange thermal energy between the fluidic thermodynamic circuit and more specifically, the first loop 18a and the Stirling engine 15 more specifically the hot zone 20 of the engine.

The second loop 18b comprises the second exchanger 4 and the fourth exchanger 17 and advantageously a pump 7 configured to circulate the second heat-transfer fluid in the fluidic thermodynamic circuit. The fourth exchanger 17 is configured to exchange thermal energy between the fluidic thermodynamic circuit and more specifically, the second loop 18b and the Stirling engine 15, more specifically the cold zone 21 of the engine.

FIG. 5 illustrates the step of starting-up the fuel cell, wherein thermal energy is supplied to the fuel cell by the thermodynamic system. The arrangement of the assembly according to the invention and its functioning are described below regarding FIG. 5.

The fuel cell to start-up, must be supplied with thermal energy. The assembly comprises a fluidic cell circuit 1. The fluidic cell circuit 1 comprises a first heat-transfer fluid exiting from the cell 1 through an outlet 325 of first heat-transfer fluid fluidically connected to an inlet 301 of the first heat-transfer fluid in the first exchanger 3. The first heat-transfer fluid passes through the first exchanger 3 and exits through an outlet 303 fluidically connected to an inlet 326 of the first heat-transfer fluid in the cell 1.

The fluidic thermodynamic circuit comprises the first loop 18a comprising an inlet of the second heat-transfer fluid 303 in the first exchanger 3. The second heat-transfer fluid passes through the first exchanger 3 and exits through an outlet 304 fluidically connected to an inlet 305 of the second heat-transfer fluid in the pump 7 which sends the second heat-transfer fluid from its outlet 306 to the third exchanger 16 with which it is fluidically connected through its inlet 307. The second heat-transfer fluid 16 passes through the third heat exchanger 16. The second heat-transfer fluid exits from the third heat exchanger 16 through an outlet 308 advantageously fluidically connected to an inlet 303 of the first heat exchanger 3.

The second loop 18b comprises the second heat exchanger 4, wherein the second heat-transfer fluid penetrates through an inlet 319. The second heat-transfer fluid passes through the second exchanger 4 and exits through an outlet 320 advantageously fluidically connected to the inlet 315 of the fourth exchanger 17. The second heat-transfer fluid passes through the fourth exchanger 17 and exits through an outlet 316 fluidically connected to the inlet 317 of a pump 7 which circulates the second heat-transfer fluid in the second loop 18b. The second heat-transfer fluid exits from the pump through an outlet 318 fluidically connected to the inlet 319 of the second exchanger 4.

The fluid circuits of the third heat exchanger and of the fourth heat exchanger 17 intended to exchange with the hot zone 20 and the cold zone 21 of the Stirling engine 15 are described below.

The circuit of the third exchanger 16 comprises an outlet 309 of the heat-transfer fluid around the Stirling engine fluidically connected to the inlet 310 of the working fluid of the third exchanger 16. The working fluid passes through the third exchanger 16 and exits through an outlet 311 fluidically connected to the inlet 327 of the heat-transfer fluid around the hot zone 20. The heat-transfer fluid circulates around the hot zone 20 and exits through the outlet 309.

The circuit of the fourth exchanger 17 comprises an outlet 328 of the heat-transfer fluid around the Stirling engine fluidically connected to the inlet 312 of the working fluid of the fourth exchanger 17. The working fluid passes through the fourth exchanger 17 and exits through an outlet 313 fluidically connected to the inlet 314 of the heat-transfer fluid around the cold zone 21. The heat-transfer fluid circulates around the cold zone 21 and exits through the outlet 312.

Advantageously, the Stirling engine is connected to an electrical supply 12 intended to supply a mechanical energy to the Stirling engine 15. In this case, the Stirling engine functions as a heat pump.

Heat is recovered from the external source 9 to supply it to the fuel cell.

At the level of the second exchanger 4, the second heat-transfer fluid recovers thermal energy from the external source 9. The heated second heat-transfer fluid transmits its thermal energy to the working fluid of the Stirling engine, either by circulation of the second heat-transfer fluid around the cold zone 21 of the engine or through the fourth exchanger 17, wherein the second heat-transfer fluid and the intermediate heat-transfer fluid circulate. The second heat-transfer fluid then penetrates into the pump 7 to be sent back to the second exchanger 4. The working fluid heated in the cold zone 21 is dilated. The mechanical energy to move the piston 25b is supplied by an electrical supply 12 configured to make a wheel 26 actuating the piston 25b rotate. The piston 25 is moved to the hot zone 20, thus moving the hot working fluid to the hot zone. At the level of the hot zone 20, the working fluid transmits its thermal energy to the second heat-transfer fluid of the first loop 18a either directly by contact of the second heat-transfer fluid with the hot zone 20, or by the third heat exchanger 16, wherein the intermediate heat-transfer fluid and the second heat-transfer fluid circulate. The working fluid is cooled. The electrical energy allowing the actuation of the piston 25 drives it to the cold zone 21 thus driving the cooled working fluid to the cold zone 21 to be heated again. The second heat-transfer fluid heated by the working fluid penetrates into the first heat exchanger 2 so as to transfer its thermal energy to the first heat-transfer fluid and thus to supply thermal energy to the cell 1.

FIG. 6 illustrates the functioning step of the fuel cell, wherein thermal energy is produced by the fuel cell and evacuated and enhanced by the thermodynamic system. The arrangement of the assembly according to the invention and its functioning are described below regarding FIG. 6.

The fuel cell 1 comprises a module for producing electrical energy 10 from the flow of electrons produced by the cell 1. The fuel cell produces thermal energy. The assembly comprises a fluidic cell circuit 1. The fluidic cell circuit 1 comprises a first heat-transfer fluid exiting from the cell 1 through an outlet 425 of first heat-transfer fluid fluidically connected to an inlet 401 of the first heat-transfer fluid in the first exchanger 3. The first heat-transfer fluid passes through the first exchanger 3 and exits through an outlet 403 fluidically connected to an inlet 426 of the first heat-transfer fluid in the cell 1.

The fluidic thermodynamic circuit comprises the first loop 18a comprising an inlet of the second heat-transfer fluid 403 in the first exchanger 3. The second heat-transfer fluid passes through the first exchanger 3 and exits through an outlet 404 fluidically connected to an inlet 405 of the second heat-transfer fluid in the third heat exchanger 16 that it passes through. The second heat-transfer fluid exits from the third heat exchanger 16 through an outlet 406 advantageously fluidically connected to an inlet 407 of a pump 7 which sends back the second heat-transfer fluid from its outlet 408 to the first exchanger 3 with which it is fluidically connected through its inlet 403.

The second loop 18b comprises the second heat exchanger 4, wherein the second heat-transfer fluid penetrates through an inlet 417. The second heat-transfer fluid passes through the second exchanger 4 and exits through an outlet 418 advantageously fluidically connected to the inlet 419 of a pump 420 which circulates the second heat-transfer fluid in the second loop 18b. The second heat-transfer fluid exits from the pump through an outlet 420 fluidically connected to the inlet 415 of the fourth exchanger 17. The second heat-transfer fluid passes through the fourth exchanger 17 and exits through an outlet 416 fluidically connected to the inlet 417 of the second exchanger 4.

The circuit of the third exchanger 16 comprises an outlet 427 of the heat-transfer fluid around the Stirling engine fluidically connected to the inlet 312 of the heat-transfer fluid of the third exchanger 16 and exits through an outlet 413 fluidically connected to the inlet 414 of the heat-transfer fluid around the hot zone 20. The heat-transfer fluid circulates around the hot zone 20 and exits through the outlet 417.

The circuit of the fourth exchanger 17 comprises an outlet 409 of the heat-transfer fluid around the Stirling engine fluidically connected to the inlet 410 of the heat-transfer fluid of the fourth exchanger 17. The heat-transfer fluid passes through the fourth exchanger 17 and exits through an outlet 411 fluidically connected to the inlet 428 of the heat-transfer fluid around the cold zone 21. The heat-transfer fluid circulates around the cold zone 21 and exits through the outlet 409.

Advantageously, the Stirling engine is connected to an alternator 11 or a compressor or allowing, in particular, the transformation of mechanical energy from the Stirling engine into electrical energy.

While functioning, the assembly described above regarding FIG. 6 allows to evacuate thermal energy from the cell to transform it into mechanical energy, even electrical, at the level of the Stirling engine.

The heat produced by the fuel cell is recovered by the first heat-transfer fluid at the level of the cell and circulates in the fluid cell circuit. The first heat-transfer fluid transfers its thermal energy, i.e. its calories to the second heat-transfer fluid when it passes through the first heat exchanger 3. The second heat-transfer fluid passing through the first heat exchanger 3 will be heated. It exits from the first exchanger 3 at a temperature greater than it was at the inlet. The second heat-transfer fluid thus penetrates into the third heat exchanger 16 allowing to transfer thermal energy from the second heat-transfer fluid to the working fluid of the Stirling engine 15. According to a possibility, the third heat exchanger comprises the circulation of the intermediate heat-transfer fluid in external contact with the hot zone 20 of the Stirling engine 15.

According to the possibility illustrated, the second heat-transfer fluid transmits its thermal energy to the intermediate heat-transfer fluid circulating in the third exchanger 16, the intermediate heat-transfer fluid increases in temperature before penetrating into the hot zone 20 of the Stirling engine. The second heat-transfer fluid exits from the third cooled exchanger and circulates through the pump 7 before being sent back to the inlet 403 of the first exchanger 3.

Advantageously, the thermodynamic system comprises the second loop 18b intended to increase the temperature differences between the working fluid in the hot zone 20 and in the cold zone 21 of the Stirling engine 15. In the loop 18b, the second heat-transfer fluid passes through a second exchanger 4 also passed through an external source 9. In this case, the external source 9 is cold, i.e. that it has a temperature less than the temperature of the second fluid circulating in the second exchanger 4. The external source 9 is such as described above. The second heat-transfer fluid passing through the second exchanger 4 is cooled before entering into contact with the working fluid of the Stirling engine 15 preferably at the level of the fourth exchanger 17 or at the level of the cold zone 21 of the Stirling engine, the second heat-transfer fluid circulating around the cold zone 21. The second heat-transfer fluid recovers thermal energy from the working fluid of the cold zone 21 so as to lower the temperature of the working fluid in this zone 21. The second heat-transfer fluid exits from the fourth exchanger or in contact with the cold zone 21 at a greater temperature than its inlet temperature. The second heat-transfer fluid then passes through a pump 7 intended to send back the second heat-transfer fluid to the second exchanger 4. At the level of the Stirling engine, the working fluid which is heated by the second heat-transfer fluid at the level of the hot zone 20 is dilated, increasing its volume and pushing the piston 25 in the direction of the cold zone 21. The working fluid which is thus located in the cold zone 21 is cooled by exchange with the second heat-transfer fluid of the second loop 18b. The cooling of the working fluid leads to its contraction, the piston 25 is thus pushed back to the hot zone 20 and so on. The translation movement of the piston 25 is transmitted to a wheel 26 advantageously connected to an alternator 11.

According to an alternative embodiment of the second embodiment, the fluidic thermodynamic circuit comprises connection branches 323, 324, 423, 424 allowing to fluidically connect the first loop 18a and the second loop 18b, in particular in the case illustrated in FIG. 7, so as to exit the Stirling engine from the fluidic circuit, and provide on a connection branch, a means for storing thermal energy of the water ballast type 22, or modules for directly using thermal energy as a furnace or a heating 23.

REFERENCES 1. fuel cell
2. fluidic cell circuit
3. first exchanger
4. second exchanger
5. compressor
6. reducer
7. pump
8. turbine
9. source
10. module for producing electricity
11. alternator
12. electrical supply
13.*a. b.* parallel branch
14.*a. b.* parallel branch
15. Stirling engine
16. third exchanger
17. fourth exchanger
18. fluidic thermodynamic circuit
18*a*. first loop
18*b*. second loop
19. three-way valves
20. hot zone
21. cold zone
22. water ballast
23. furnace or heating
24. working fluid circuit
25.*a* piston-25.*b* piston
26. wheel
27. communication between the hot zone and the cold zone
101. first heat-transfer fluid inlet in the first exchanger
102. first heat-transfer fluid outlet of the first exchanger
103. second heat-transfer fluid inlet in the first exchanger
104. second heat-transfer fluid outlet of the first exchanger
105. second heat-transfer fluid inlet in the reducer
106. second heat-transfer fluid outlet of the reducer
107. second heat-transfer fluid inlet in the second exchanger
108. second heat-transfer outlet of the second exchanger
109. second heat-transfer inlet in the compressor
110. second heat-transfer fluid outlet of the compressor
111. source inlet in the second exchanger
112. source outlet of the second exchanger
113. outlet of the first heat-transfer fluid of the cell
114. inlet of the first heat-transfer fluid in the cell
201. first heat-transfer fluid inlet in the first exchanger
202. first heat-transfer fluid outlet of the first exchanger
203. second heat-transfer fluid inlet in the first exchanger
204. second heat-transfer fluid outlet of the first exchanger
205. second heat-transfer fluid inlet in the turbine
206. second heat-transfer fluid outlet in the turbine
207. second heat-transfer fluid inlet in the second exchanger
208. second heat-transfer fluid outlet of the second exchanger
209. second heat-transfer fluid inlet in the pump
210. second heat-transfer fluid outlet of the pump
211. source inlet in the second exchanger
212. source outlet of the second exchanger
213. outlet of the first heat-transfer fluid of the cell
214. inlet of the first heat-transfer fluid in the cell
301. first heat-transfer fluid inlet in the first exchanger
302. first heat-transfer fluid outlet of the first exchanger
303. second heat-transfer fluid inlet in the first exchanger
304. second heat-transfer fluid outlet of the first exchanger
305. second heat-transfer fluid inlet in the pump
306. second heat-transfer fluid outlet of the pump
307. second heat-transfer fluid inlet in the third exchanger
308. second heat-transfer fluid outlet of the third exchanger
309. working fluid outlet of the Stirling engine
310. working fluid inlet in the third exchanger
311. working fluid outlet of the third exchanger
312. working fluid inlet in the fourth exchanger
313. working fluid outlet of the fourth exchanger
314. working fluid inlet of the Stirling engine
315. second heat-transfer fluid inlet in the fourth exchanger
316. second heat-transfer fluid outlet of the fourth exchanger
317. second heat-transfer fluid inlet in the pump
318. second heat-transfer fluid outlet of the pump
319. second heat-transfer fluid inlet in the second exchanger
320. second heat-transfer fluid outlet of the second exchanger
321. source inlet in the second exchanger
322. source outlet of the second exchanger
323. connection branch
324. connection branch
325. outlet of the first heat-transfer fluid of the cell
326. inlet of the first heat-transfer fluid in the cell
327. intermediate heat-transfer fluid inlet around the hot zone
328. intermediate heat-transfer fluid outlet of the cold zone
401. first heat-transfer fluid inlet in the first exchanger
402. first heat-transfer fluid outlet of the first exchanger
403. second heat-transfer fluid inlet in the first exchanger
404. second heat-transfer fluid outlet of the first exchanger
405. second heat-transfer fluid inlet in the third exchanger
406. second heat-transfer fluid outlet of the third exchanger
407. second heat-transfer fluid inlet in the pump
408. second heat-transfer fluid outlet of the pump
409. working fluid outlet of the Stirling engine
410. working fluid inlet in the fourth exchanger
411. working fluid outlet of the fourth exchanger
412. working fluid inlet in the third exchanger
413. working fluid outlet of the third exchanger
414. working fluid inlet of the Stirling engine
415. second heat-transfer fluid inlet in the fourth exchanger
416. second heat-transfer fluid outlet of the fourth exchanger
417. second heat-transfer fluid inlet in the second exchanger
418. second heat-transfer fluid outlet of the second exchanger
419. second heat-transfer fluid inlet in the pump
420. second heat-transfer fluid outlet of the pump
421. source inlet in the second exchanger
422. source outlet of the second exchanger
423. connection branch
424. connection branch 425. outlet of the first heat-transfer fluid of the cell
426. inlet of the first heat-transfer fluid in the cell
427. outlet of the intermediate heat-transfer fluid of the hot zone
428. inlet of the intermediate heat-transfer fluid around the cold zone.

The invention claimed is:

1. An assembly configured for producing energy, the assembly comprising:
   a fuel cell;
   a fluidic cell circuit comprising a first heat-transfer fluid and arranged at least partially around the fuel cell; and
   a reversible thermodynamic system that, based on a temperature of the fuel cell, alternatively: (i) evacuates thermal energy produced by the fuel cell and transforms it into mechanical energy through the first heat-transfer fluid; and (ii) inputs thermal energy to the fuel cell through the first heat-transfer fluid,
   wherein the reversible thermodynamic system comprises:
   a fluidic thermodynamic circuit comprising a second heat-transfer fluid;
   a first exchanger configured to exchange thermal energy between the fluidic thermodynamic circuit and the fluidic cell circuit; and
   a second exchanger configured to exchange thermal energy between the fluidic thermodynamic circuit and an external source,
   wherein one or more switching members modify a circulation path for the second heat-transfer fluid in the fluidic thermodynamic circuit, and
   wherein the reversible thermodynamic system evacuates thermal energy when the temperature of the fuel cell is below 120° C., and the reversible thermodynamic system inputs thermal energy when the temperature of the fuel cell is above 120° C.

2. The assembly of claim 1, wherein the reversible thermodynamic system comprises a module configured for producing thermal energy connected to the first heat exchanger.

3. The assembly of claim 1, wherein the module is fluidically and/or thermally connected to the first exchanger through the fluidic thermodynamic circuit so as to exchange the thermal energy produced by the module for producing thermal energy to the fluidic cell circuit.

4. The assembly of claim 1, wherein the reversible thermodynamic system comprises a system associating an organic Rankine cycle module and a heat pump.

5. The assembly of claim 4, wherein the heat pump comprises a compressor and a reducer arranged in series with the first exchanger and the second exchanger.

6. The assembly of claim 4, wherein the organic Rankine cycle module comprises a turbine and a pump configured to make the second heat-transfer fluid circulate in the fluidic thermodynamic circuit,
   wherein the turbine and the pump are arranged in series with the first exchanger and the second exchanger.

7. The assembly of claim 5, wherein the compressor is arranged in parallel with the turbine and the pump is arranged in parallel with the reducer.

8. The assembly of claim 7, wherein the fluidic thermodynamic circuit comprises a heat pump circuit fluidically connecting the first exchanger, the reducer, the second exchanger, the compressor, and again, the first exchanger.

9. The assembly of claim 7, wherein the fluidic thermodynamic circuit comprises an organic Rankine cycle module circuit successively fluidically connecting the first exchanger, the turbine, the second exchanger, the pump, and again, the first exchanger.

10. The assembly of claim 7, wherein the one or more switching members configured for switching the second heat-transfer fluid alternatively to the turbine or the compressor and to the pump or the reducer.

11. The assembly of claim 1, wherein the reversible thermodynamic system comprises a reversible Stirling engine configured to alternatively produce mechanical energy from thermal energy and to produce thermal energy from mechanical energy.

12. The assembly of claim 11, wherein the fluidic thermodynamic circuit comprises a first loop and a second loop,
    wherein the first loop is configured to allow the circulation of the second heat-transfer fluid between the first exchanger and a hot zone of the Stirling engine, and
    wherein the second loop is configured to allow the circulation of the second heat-transfer fluid between the second exchanger and a cold zone of the Stirling engine.

13. The assembly of claim 12, further comprising:
    a third heat exchanger; and
    a fourth heat exchanger,
    wherein the third heat exchanger is arranged on the first loop configured to exchange thermal energy between the second heat-transfer fluid of the first loop and an intermediate heat-transfer fluid configured to circulate around the hot zone of the Stirling engine, and
    wherein the fourth heat exchanger is arranged on the second loop configured to exchange thermal energy between the second heat-transfer fluid of the second loop and the intermediate heat-transfer fluid configured to circulate around the cold zone of the Stirling engine.

14. The assembly of claim 1, wherein the fuel cell is of the high temperature proton exchange membrane type.

15. The assembly of claim 1, comprising a module for producing energy associated with the fuel cell configured to produce electricity from the flow of electrons produced by the fuel cell.

16. A method for producing energy by an assembly for producing energy with the assembly of claim 1, the method comprising
    starting-up the fuel cell by an input of thermal energy to the cell; and
    functioning of the fuel cell to generate an electrical current and thermal energy,
    wherein, during the starting-up, the reversible thermodynamic system inputs thermal energy to the fuel cell through the first heat-transfer fluid, and
    wherein the functioning of the reversible thermodynamic system evacuates the thermal energy produced by the fuel cell through the first heat-transfer fluid and transforms it into mechanical energy through the second heat-transfer fluid.

17. The method of claim 16, wherein, during the starting-up, the first heat exchanger transmits thermal energy from the second heat-transfer fluid circulating in a fluidic thermodynamic circuit to the first heat-transfer fluid circulating in a fluidic cell circuit.

18. The method of claim 16, wherein, during the starting-up, the second heat exchanger transmits thermal energy from an external source to the second heat-transfer fluid circulating in the fluidic thermodynamic circuit.

19. The method of claim 18, wherein the thermodynamic system comprises an organic Rankine cycle module functioning during the functioning of the fuel cell and configured to transform the heat produced into electrical energy, and
wherein the organic Rankine cycle module is associated with a heat pump functioning during the starting-up of the fuel cell and configured to supply thermal energy to the fuel cell.

20. The method of claim 19, wherein, during the starting-up of the fuel cell, the second heat-transfer fluid circulates in the fluidic thermodynamic circuit by passing successively through the compressor circulating the second heat-transfer fluid, then the second heat-transfer fluid passes into the first exchanger,
wherein the second heat-transfer fluid is condensed and transfers thermal energy to the first heat-transfer fluid for the starting-up of the fuel cell, then passes through the reducer,
wherein the second heat-transfer fluid suffers a pressure drop, then passes through the second exchanger, and
wherein the second heat-transfer fluid is evaporated by recovering thermal energy from a hot source.

21. The method of claim 19, wherein, during the functioning of the fuel cell, the second heat-transfer fluid circulates in the fluidic thermodynamic circuit by successively passing through the first exchanger,
wherein the second heat-transfer fluid is vaporized by recovering thermal energy from the first heat-transfer fluid circulating in the fluidic cell circuit, then through the turbine,
wherein the second heat-transfer fluid is expanded, allowing for a production of mechanical energy, then through the second exchanger,
wherein the second heat-transfer fluid is condensed in contact with a cold source, then through a pump, and
wherein the second heat-transfer fluid is pressurized to be sent to the first exchanger.

22. The method of claim 16, wherein the thermodynamic system comprises a reversible Stirling engine configured to supply thermal energy to the fuel cell during the starting-up and configured to transform the heat produced into mechanical energy during the functioning.

23. The method of claim 22, wherein, during the starting-up, the second heat-transfer fluid recovers thermal energy at the level of the second exchanger by exchange with an external source, then transmits thermal energy to a cold zone of the Stirling engine by exchange with a working fluid circulating in the Stirling engine, a piston configure to be actuated by a wheel moves the working fluid in the hot zone, the second heat-transfer fluid recovers thermal energy by exchange with the working fluid of the hot zone of the Stirling engine that it transfers to the first heat-transfer fluid in the first exchanger.

24. The method of claim 23, wherein, during the functioning, the second heat-transfer fluid recovers thermal energy at the level of the first exchanger by exchange with the first heat-transfer fluid then transmits thermal energy to a hot zone of the Stirling engine by exchange with a working fluid circulating in the Stirling engine so as to actuate a piston of the engine producing a mechanical energy and moving the working fluid in the cold zone, the second heat-transfer fluid recovering thermal energy by exchange with the working fluid of the cold zone of the Stirling engine.

* * * * *